(12) United States Patent
Wang (10) Patent No.: US 8,042,229 B2
(45) Date of Patent: Oct. 25, 2011

(54) FASTENER

(76) Inventor: Dennis H. Wang, Baldwin Park, CA (US)

( * ) Notice: Subject to any disclaimer, the term of this patent is extended or adjusted under 35 U.S.C. 154(b) by 363 days.

(21) Appl. No.: 12/403,446

(22) Filed: Mar. 13, 2009

(65) Prior Publication Data

US 2010/0229343 A1 Sep. 16, 2010

(51) Int. Cl.
*E05D 7/12* (2006.01)
(52) U.S. Cl. ........... 16/270; 16/253; 211/85.7; 211/171; 248/242; 248/245
(58) Field of Classification Search ............ 16/270, 16/374, 223, 252–254; 211/85.7, 171, 174, 211/193, 207; 248/201, 240, 242, 245; 403/344, 403/373, 119
See application file for complete search history.

(56) References Cited

U.S. PATENT DOCUMENTS

| | | | | |
|---|---|---|---|---|
| 1,586,854 A * | 6/1926 | Stansfield | ................. | 211/22 |
| 5,145,135 A * | 9/1992 | Thompson | ................. | 248/201 |
| 5,833,079 A * | 11/1998 | Roberts | ................. | 211/85.7 |
| 6,390,309 B1 * | 5/2002 | Tucker | ................. | 211/85.7 |
| 7,201,282 B1 * | 4/2007 | Alderman | ................. | 211/60.1 |
| 7,284,671 B1 * | 10/2007 | Doscher | ................. | 211/59.1 |
| 2003/0178382 A1 * | 9/2003 | Tucker | ................. | 211/85.7 |
| 2006/0108302 A1 * | 5/2006 | Matsui | ................. | 211/85.7 |

* cited by examiner

*Primary Examiner* — William L. Miller
(74) *Attorney, Agent, or Firm* — Alan Kamrath; Kamrath & Associates PA (57) ABSTRACT

A fastener includes a body member including a receiving portion longitudinally formed therein, two clamping portions transversely extending from the receiving portion and two through-holes in the clamping portions, respectively. A joint member, coupled to the two clamping portions of the body member in a pivotal manner, includes a cam portion defined on the distal portion of a second end of the joint member and includes a fixed hole provided through the second end transversely and corresponding to the through-holes. The joint member is moveable between an unfolding position and a folding position. The cam portion restricts a pivot angle of the joint member in the unfolding position. A fixing member is installed onto the clamping portions opposite to the joint member, with the fixing member selectively inserted into the through-holes and the fixed hole for fixing the joint member with respect to a support.

20 Claims, 11 Drawing Sheets

FASTENER

BACKGROUND OF THE INVENTION

1. Field of the Invention

The present invention relates to a fastener.

2. Description of the Related Art

Figure 10:
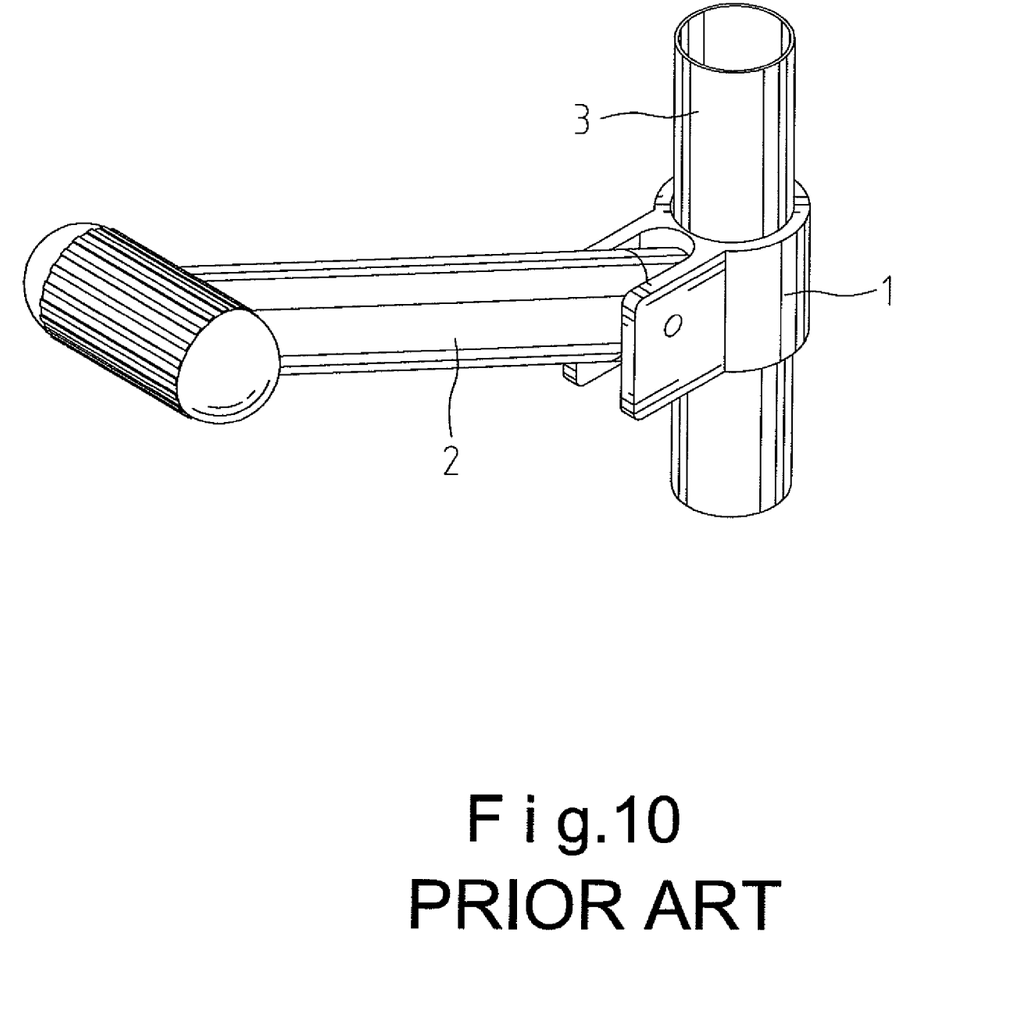
FIG. 10 is a partial, perspective view of a conventional combination of a fastener and a rack mounted on a support member.
Figure 11:
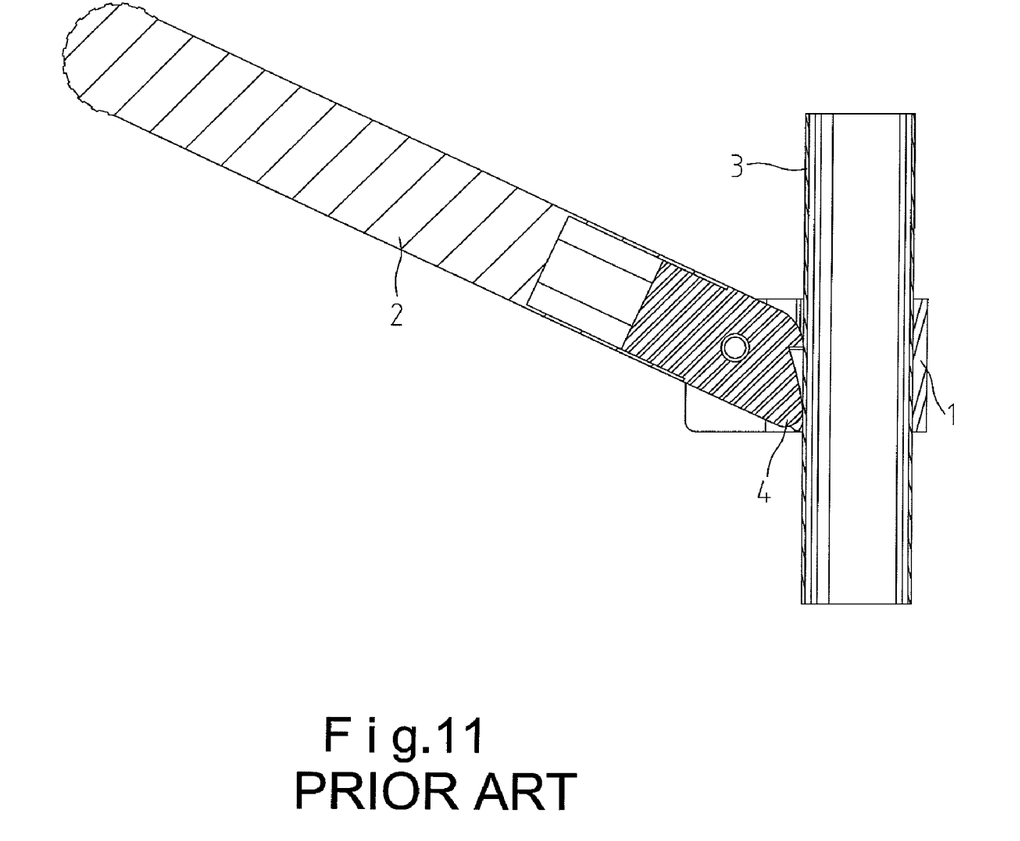
FIG. 11 is a cross-sectional view of the conventional combination of the fastener and the rack mounted on the support member shown in FIG. 10.

Referring to FIGS. 10 and 11, a conventional fastener 1 is mounted on a support member 3 and adapted to pivotally couple to a rack 2. A projection 4 is formed on an end of the rack 2 and proximal to the support member 3. While an article is disposed on the rack 2, the rack 2 is driven to pivot slightly. Then, the projection 4 is abutted against the support member 3 for keeping the rack 2 in position. At the same time, the fastener 1 can not slide with respect to the support member 3 via the projection 4.

However, it is easy to disengage the projection 4 from the support member 3 by accident so that the fastener 1 falls downwardly. It is not a firm structure.

The present invention is therefore intended to obviate or at least alleviate the problems encountered in the prior art.

SUMMARY OF THE INVENTION

Aspects of the present invention address one or more of the issues mentioned above, thereby providing a fastener adapted for coupling a rack to a support. The fastener includes a body member, a joint member pivotally connected to the body member and a fixing member adapted to selectively fix the joint member with respect to the support. The rack is coupled to the joint member opposite to the body member.

Other advantages and features of the present invention will become apparent from the following description referring to the drawings.

BRIEF DESCRIPTION OF THE DRAWINGS

The present invention will be described via detailed illustration of the preferred embodiment referring to the drawings.

DETAILED DESCRIPTION OF THE PREFERRED EMBODIMENT

Figure 1:
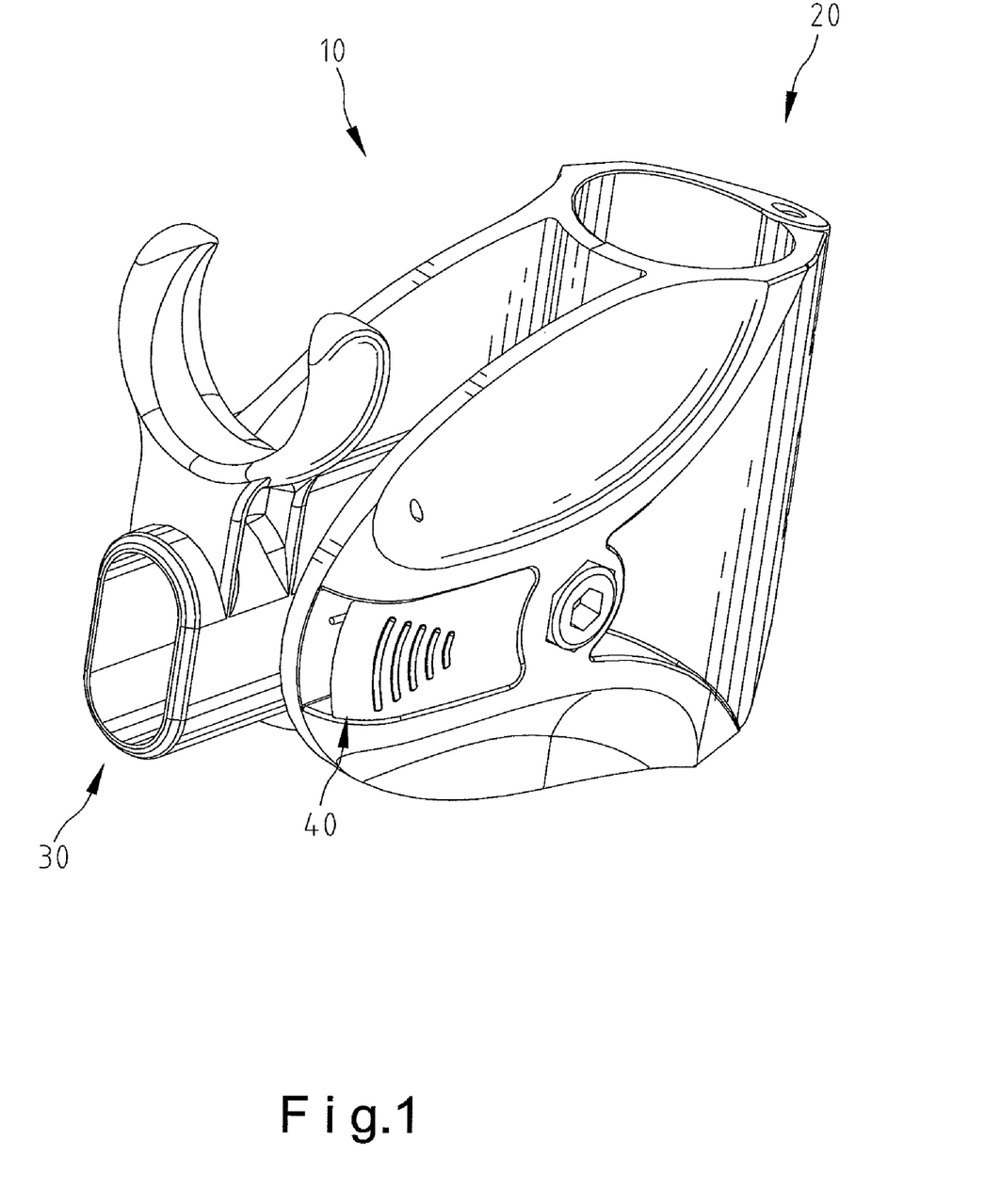
FIG. 1 is a perspective view of a fastener according to the preferred embodiment of the present invention.
Figure 2:
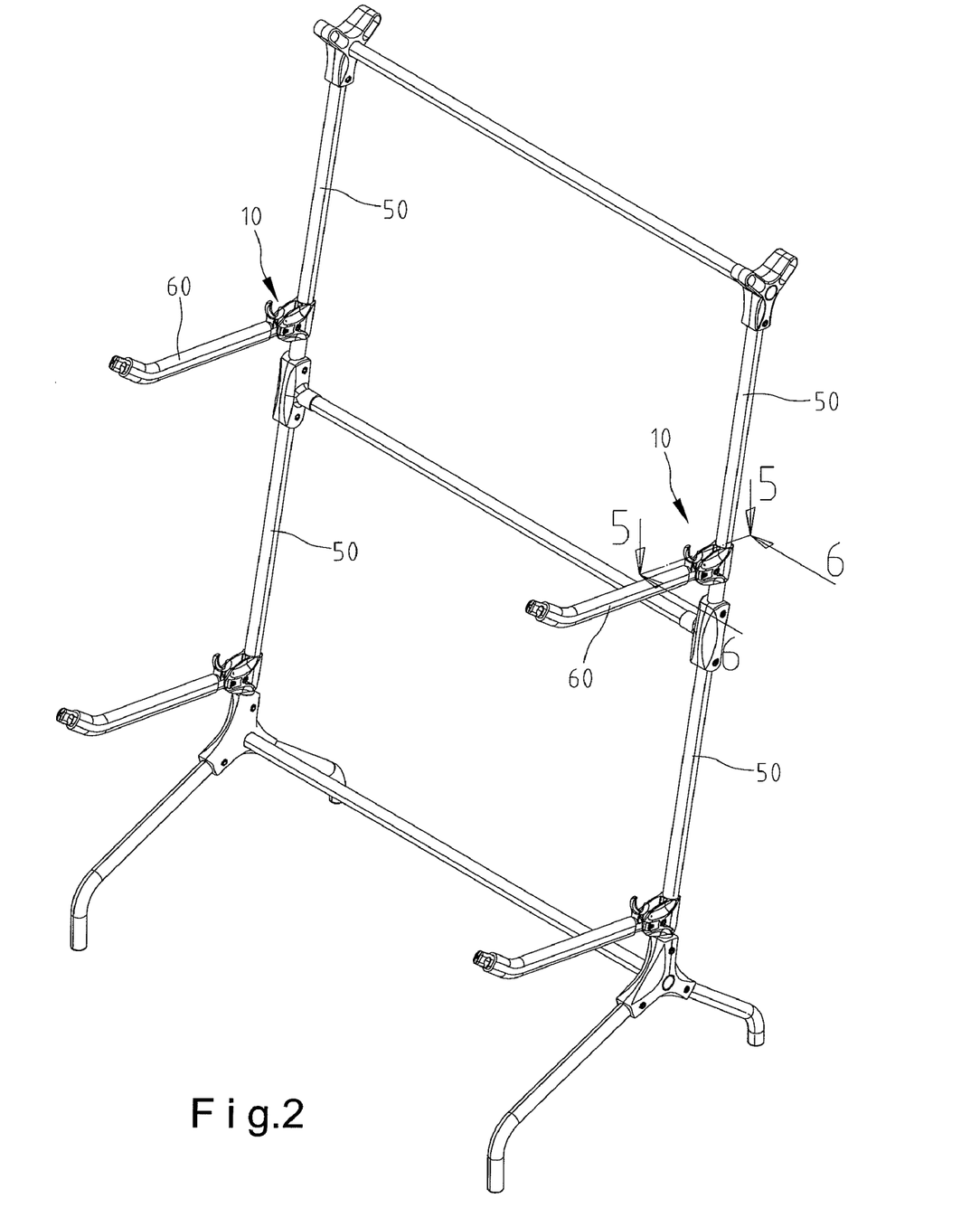
FIG. 2 is a perspective view of numbers of the fastener shown in FIG. 1, illustrating combinations of the fastener and racks installed to a support.

Referring to FIGS. 1 through 6, a fastener 10 in accordance with the preferred embodiment in the present invention includes a body member 20, a joint member 30 and a fixing member 40. The body member 20 is able to be mounted on the support 50 slideably. The joint member 30 is sandwiched in the body member 20. An end of the joint member 30 extends from the body member 20 and is coupled to one rack 60. The fixing member 40 is used to selectively lock the joint member 30 in the body member 20. After combining several fasteners 10 to the support 50 and adjusting positions of the fasteners 10 on the support 50, as shown in FIG. 2, the racks 60 which are respectively coupled to the joint members 30 are able to hang kayaks, Surfboards or the like thereon.

Figure 3:
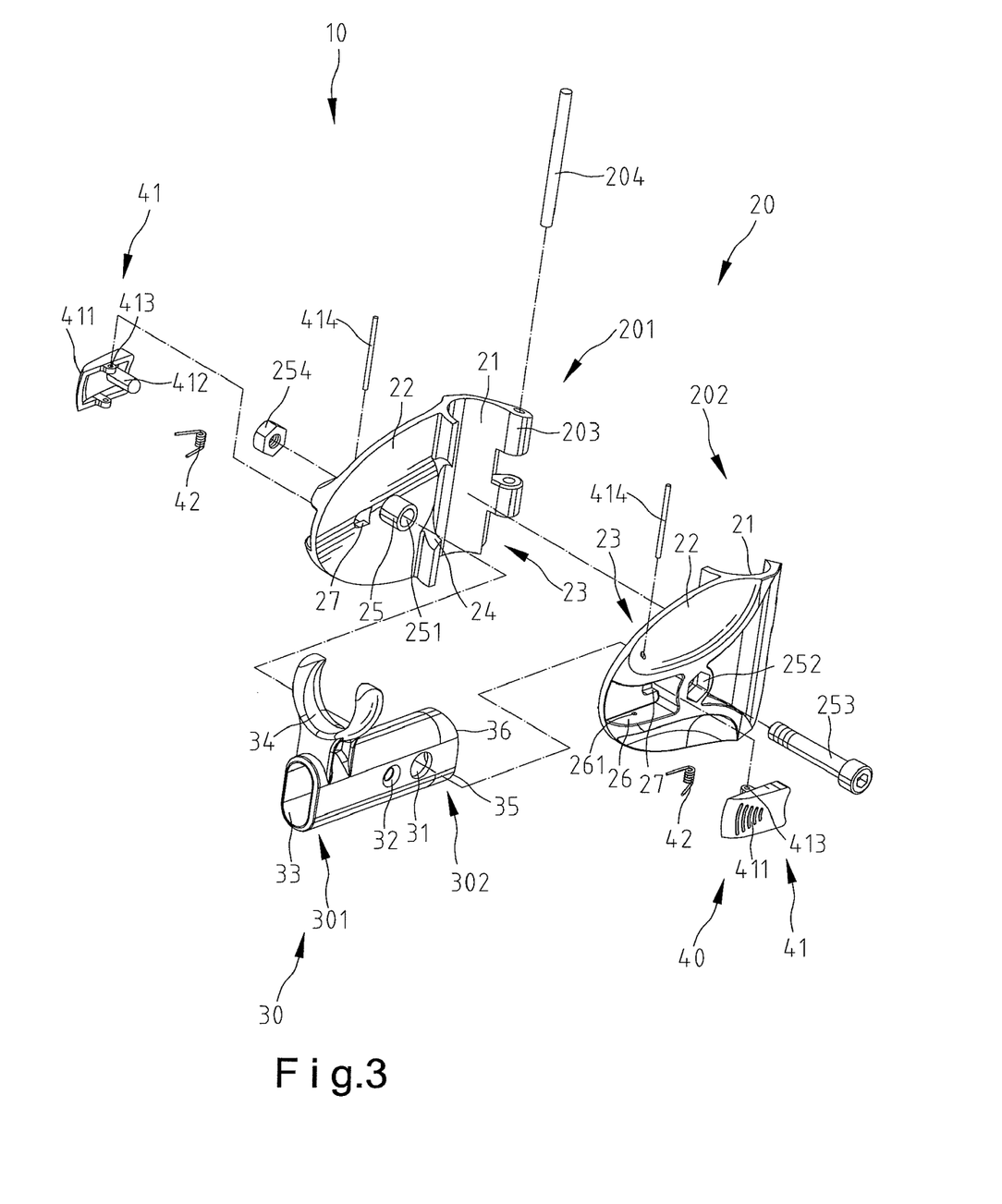
FIG. 3 is an exploded view of the fastener shown in FIG. 1.
Figure 4:
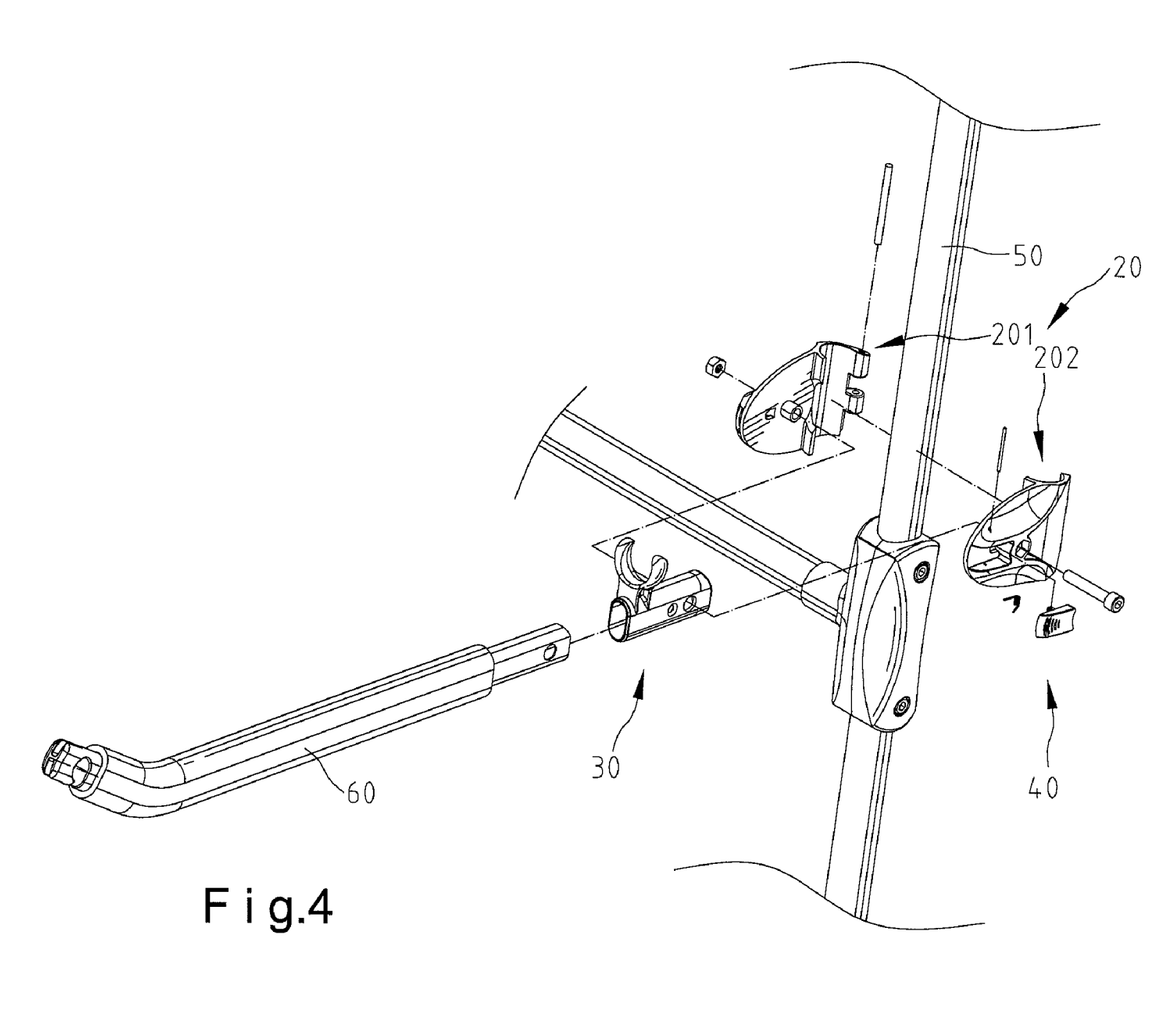
FIG. 4 is a partial, exploded view of the fastener, the rack and the support shown in FIG. 2.
Figure 5:
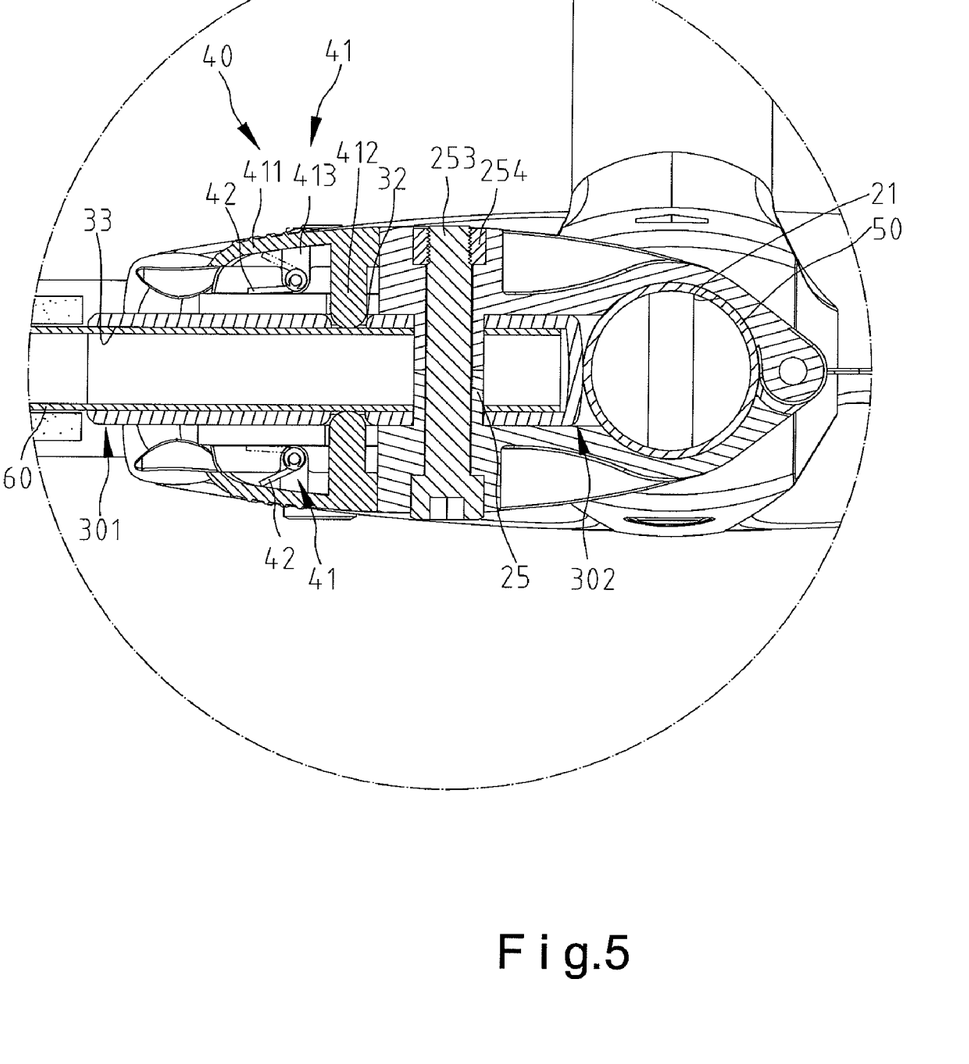
FIG. 5 is a cross-sectional view taken along a line 5-5 shown in FIG. 2.
Figure 6:
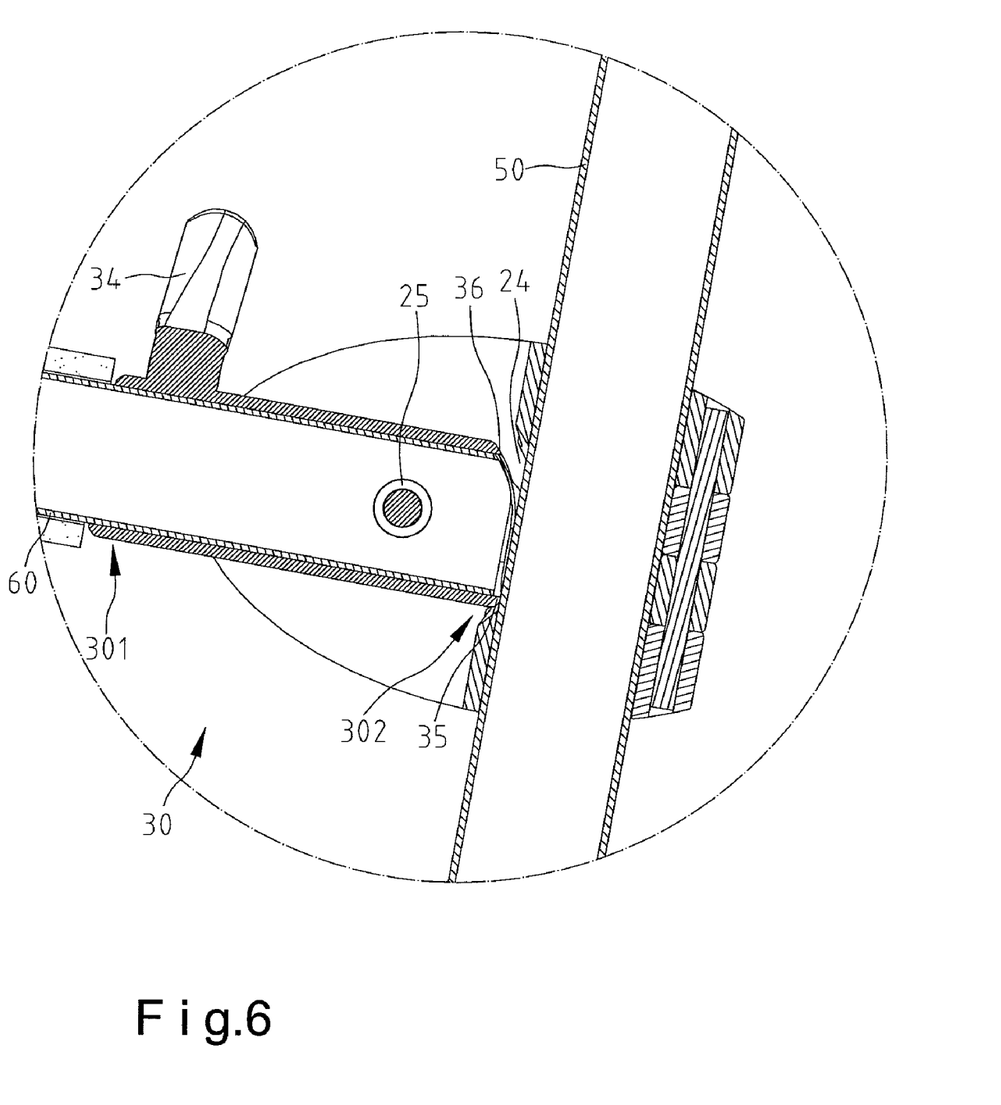
FIG. 6 is a cross-sectional view taken along a line 6-6 shown in FIG. 2.

The body member 20 consists of a first coupled element 201 and a second coupled element 202, and the first and second coupled elements 201, 202 engage with each other via two pivotal ears 203 formed on sides of the first and second coupled elements 201, 202 and a pivotal pin 204. The pivotal ears 203 of the first and second coupled elements 201, 202 are wedged with each other, and the pivotal pin 204 is inserted through the pivotal ears 203 for attaching the first and second coupled elements 201, 202 to each other. Thus, the first and second coupled elements 201, 202 are able to pivot relative to each other with respect to the pivotal pin 204.

The assembled body member 20 includes a receiving portion 21 longitudinally formed therein and proximal to the pivotal ears 203. Two clamping portions 22 are respectively defined on the first and second coupled elements 201, 202 transversely extending from the receiving portion 21 and parallel to each other and an open space 23 defined between the clamping portions 22. The receiving portion 21 is mounted on the support 50. A gap 24 is formed on the sidewall of the receiving portion 21 and communicates the space 23 with the receiving portion 21. A pivotal portion 25 provided in the space 23 are formed by the first and second coupled elements 201, 202 and provided to transversely pierce through and interconnect the clamping portions 22. A receptacle 26 is formed on the outer periphery of each clamping portion 22 and opened to the distal of the related one of the first and second coupled elements 201, 202. A direction of each receptacle 26 is perpendicular to that of the receiving portion 21. A through-hole 27 is provided in the receptacle 26 of each clamping portion 22 and communicates with the space 23. Horizontal positions of the gap 24, the pivotal portion 25 and the receptacles 26 are the same approximately.

A channel 251 is formed through the pivotal portion 25 and pierces the clamping portions 22. Two non-circular holes 252 are respectively formed on the outer periphery of the clamping portions 22 and integrated to two ends of the channel 251.

The joint member 30 is coupled to the pivotal portion 25 in a pivotal manner and defines a first end 301 opposite to the body member 20 and a second end 302 pivotally coupled to the body member 20. A pivoting hole 31 and a fixed hole 32 are respectively provided through the second end 302 transversely and correspond to the pivotal portion 25 and the through-holes 27.

A bolt 253 and a nut 254 are adapted to couple the first and second coupled elements 201, 202 and the second end 302 of the joint member 30 to one another by inserting the bolt 253 through the channel 251 from one of the non-circular holes 252, through the pivoting hole 31 to the other non-circular hole 252 and engaging the bolt 253 with the nut 254. The nut 254 is embedded in the related non-circular hole without protruding therefrom. In this case, each non-circular hole is preferably a hexagonal hole, and nut 254 is preferably a hexagonal nut. Further, it is easy to disengage the bolt 253 from the nut 254 so that it is quick and easy to detach the first and second coupled elements 201, 202 from each other for changing position of the body member 20 on the support 50.

A joint sheath 33 is provided at the first end 301 of the joint member 30 and opened opposite to the second end 302. One rack 60 is inserted into the joint sheath 33. A hook portion 34 is integrally formed on the top side of the first end 301 of the joint member 30 and adapted to clamp the support 50 selectively. A cam portion 35 and a guiding portion 36 are defined on the distal portion of the second end 302.

The joint member 30 is moveable between an unfolding position and a folding position. While the rack 60 is coupled to the joint member 30 for hanging articles (kayaks, surfboards or the like), the weight of the rack 60 enables the joint member 30 to pivot with respect to the support 50 to the unfolding position. A downward pivoting angle of the joint member 30 with respect to the support 50 is restricted by the cam portion 35 which is selectively abutted against the support 50 through the gap 24. Also, during pivoting of the joint member 30 with respect to the support 50, the guiding portion 36 is not in contact to the support 50. While the rack 60 collapsing with respect to the support 50, the joint member 30 is pivoted toward the support 50, and the cam portion 35 is disengaged from the support 50. Then, the hook portion 34 clamps the support 50 for fixing the joint member 30 and the rack 60 to the support 50. Further, it can save area and space for storing the rack 60 and the support 50.

A fixing member 40 is installed to the outer periphery of the clamping portions 22 and adapted to selectively fix the joint member 30 with respect to the body member 20. The fixing member 40 includes two fixing elements 41 and two elastic elements 42. The fixing elements 41 respectively fit in the receptacles 26, and the elastic elements 42 are respectively sandwiched between the fixing elements 41 and the receptacles 26. Each fixing element 41, which has a first end and a second end proximal to the receiving portion 21 includes a pressing portion 411 on the outer periphery of the first end thereof. An engaged portion 412 on the interior periphery of the second end of each fixing element 41 is selectively inserted into the through-hole 27 of the related receptacle 26. Two pivotal ears 413 are provided on each fixing element 41 and abutted with the inner wall of the related receptacle 26. A pivotal pin 414 is inserted through the pivotal ears 413 of each fixing element 41 and two apertures 261 of the related receptacle 26 as to pivotally couple each fixing element 41 to the related receptacle 26.

Figure 7:
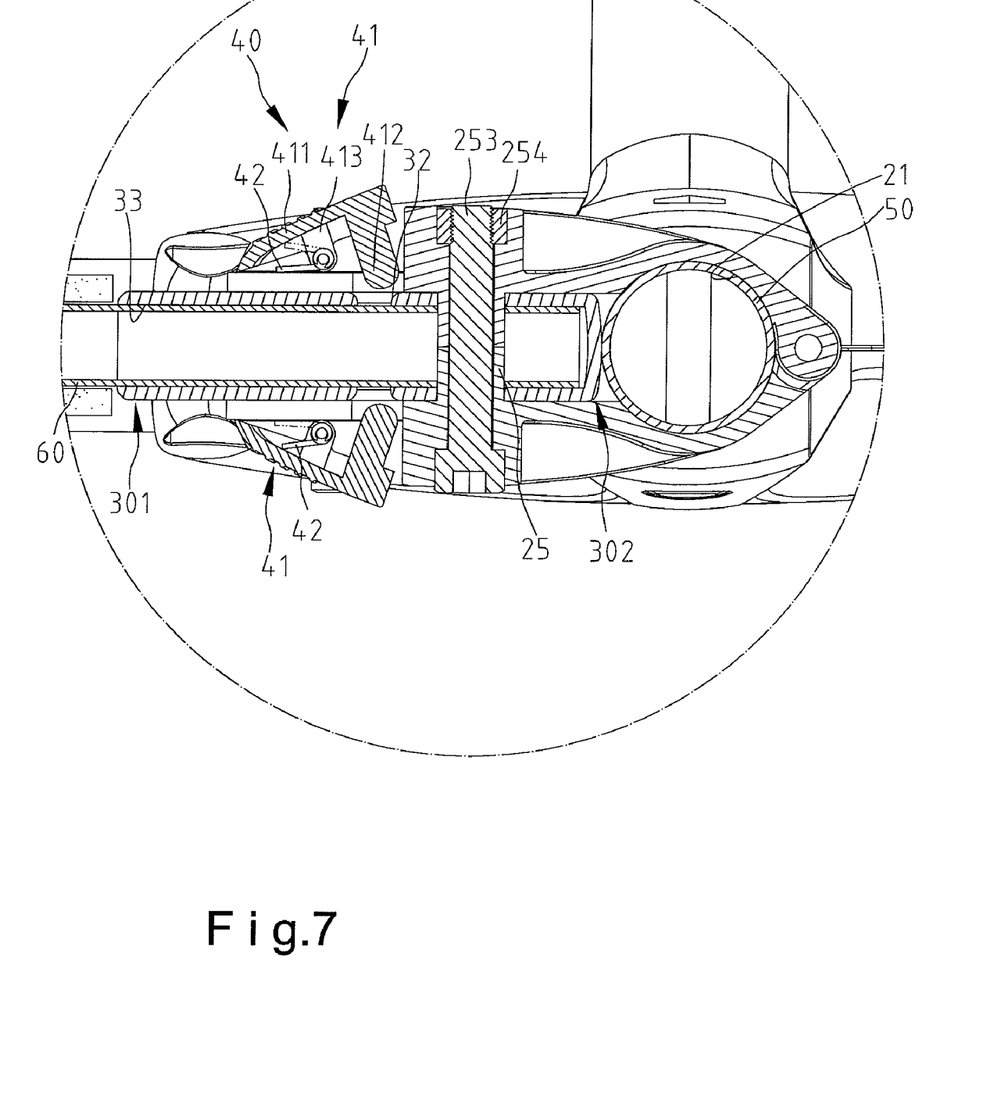
FIG. 7 is another cross-sectional view similar to FIG. 5, illustrating a fixing member in another position.
Figure 8:
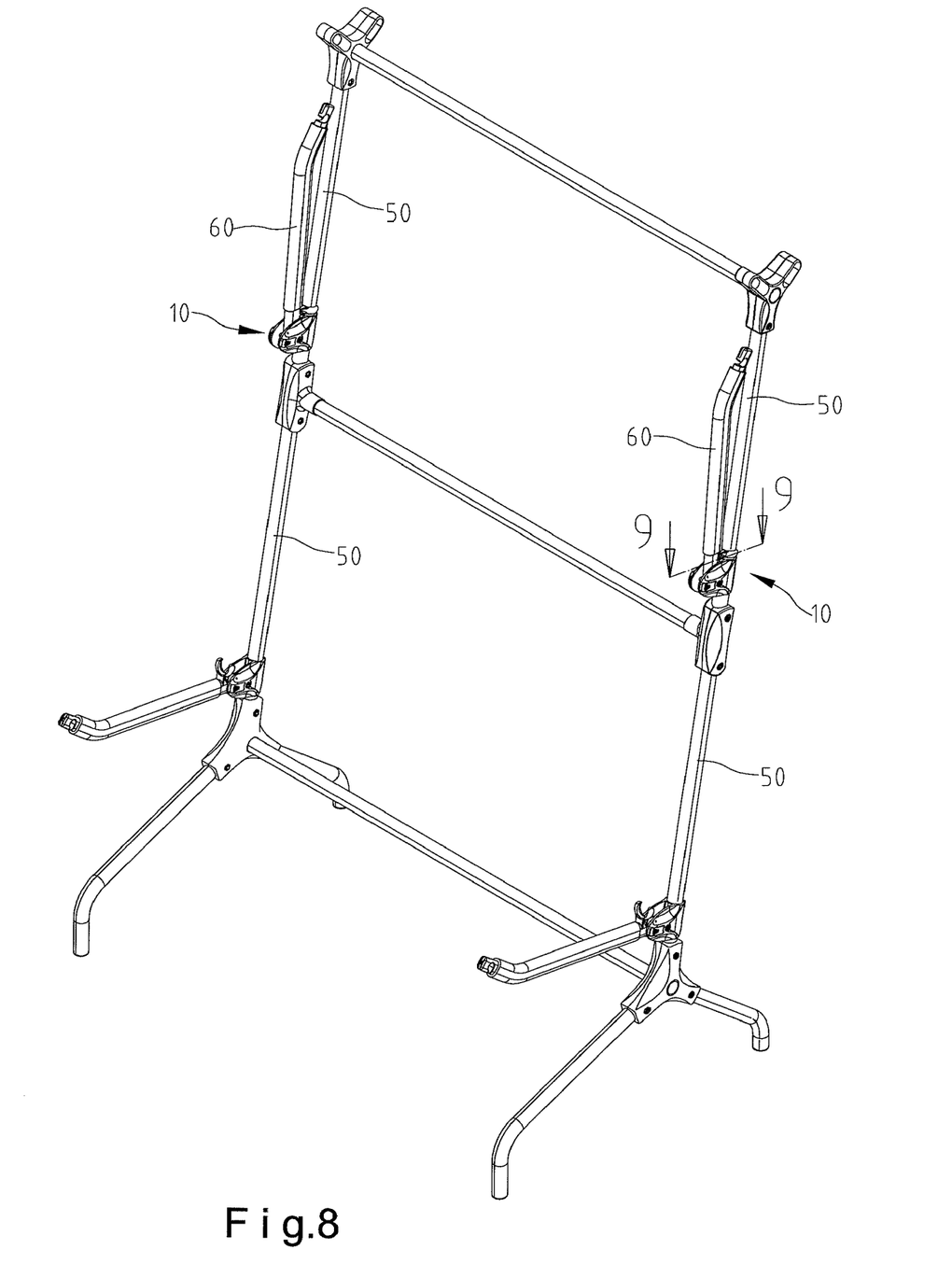
FIG. 8 is another perspective view similar to FIG. 2, illustrating the racks in a collapse position.
Figure 9:
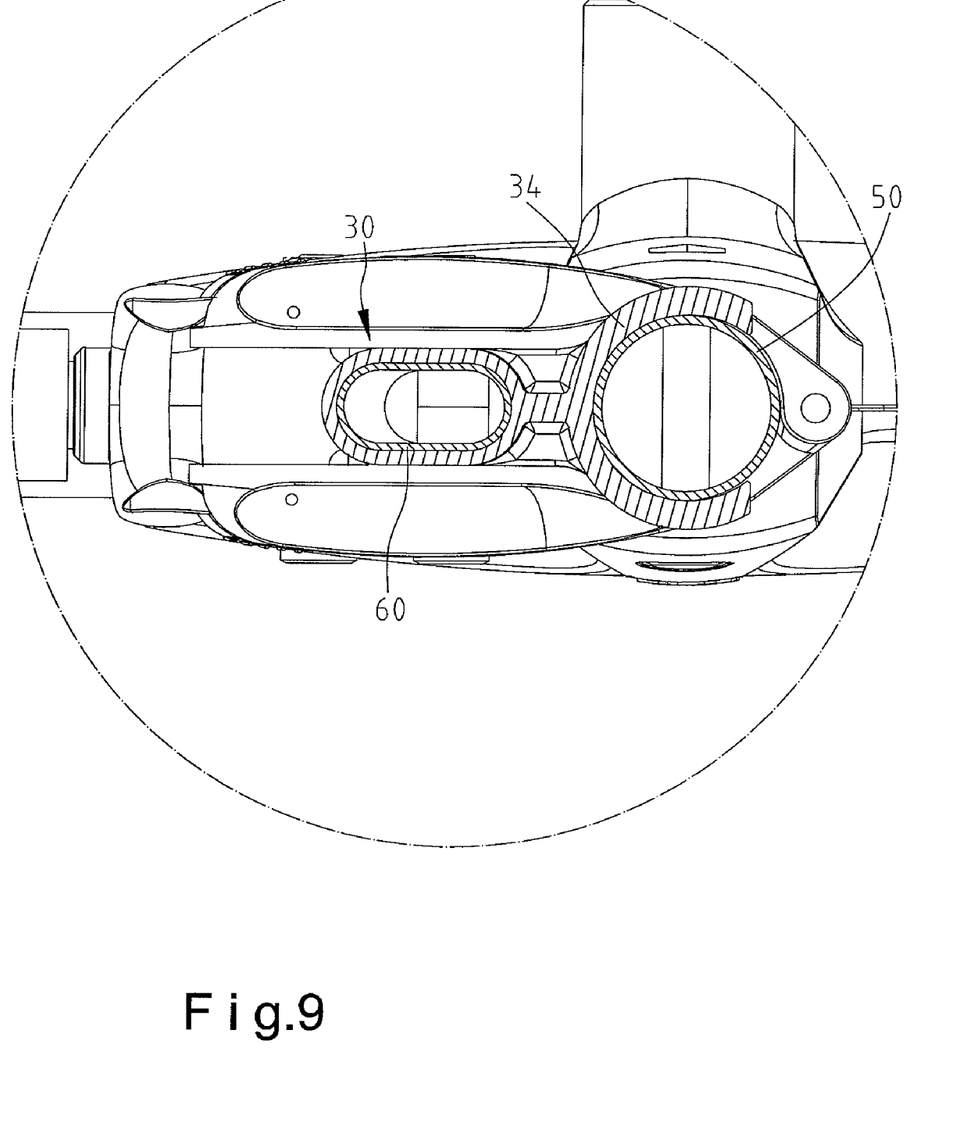
FIG. 9 is a cross-sectional view taken along a line 9-9 shown in FIG. 8.

While the fixing elements 41 are in an idle position, the elastic elements 42 push the first end of the fixing elements 41 outwardly so that the engaged portions 412 pivot inwardly while inserted into the through-holes 27 and the fixed holes 32 for restricting the joint member 30 to pivot with respect to the body member 20. While pressing the pressing portions 411 inwardly and while the fixing elements 41 are in an operative position, the engaged portions 412 pivot outwardly to disengage from the through-holes 27 and the fixed holes 32 so that the joint member 30 is able to pivot with respect to the body member 20 (shown in FIGS. 7 through 9).

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fastener comprising:
    a body member including a receiving portion longitudinally formed therein, wherein the receiving portion is slidably mounted to a support, with two clamping portions transversely extending from the receiving portion, and with a through-hole provided through each clamping portion, respectively;
    a joint member having a first end opposite to the body member and a second end coupled to the two clamping portions of the body member in a pivotal manner, with the joint member including a cam portion defined on a distal portion of the second end and a fixed hole provided through the second end transversely and corresponding to the through-holes;
    wherein the joint member is moveable relative to the body member between an unfolding position and a folding position; wherein the cam portion restricts a pivot angle of the joint member relative to the body member when the joint member is in the unfolding position; and
    a fixing member installed to the two clamping portions of the body member opposite to the joint member, with the fixing member selectively inserted into the through-holes and the fixed hole for fixing the joint member in position, with an open space defined between the two clamping portions and a pivotal portion provided in the open space, with the joint member coupled to the pivotal portion in a pivotal mariner.

2. The fastener as claimed in claim 1, further comprising two receptacles respectively formed on the outer periphery of the two clamping portions, with the through-hole formed in each of the two receptacles respectively; wherein the fixing member includes two fixing elements respectively fit in the two receptacles, with elastic elements respectively sandwiched between the two fixing elements and the two receptacles, with each fixing element having an engaged portion; wherein while the two fixing elements are in an idle position, the engaged portions pivot for insertion into the two through-holes and the fixed hole via the elastic elements.

3. The fastener as claimed in claim 2, wherein the fixing element which has a first end and a second end proximal to the receiving portion, wherein the fixing element includes a pressing portion on an outer periphery of the first end thereof, with the engaged portion on an interior periphery of the second end of the fixing element and pressing the pressing portion outwardly while the fixing element in the idle position.

4. The fastener as claimed in claim 1, further comprising a gap formed on a sidewall of the receiving portion and communicating the open space with the receiving portion, with the second end of the joint member proximal to the gap.

5. The fastener as claimed in claim 4, further comprising a joint sheath provided at the first end of the joint member, with a rack inserted into the joint sheath.

6. The fastener as claimed in claim 4, wherein the gap and the pivotal portion are at a same horizontal position approximately.

7. The fastener as claimed in claim 1 wherein the body member consists of a first coupled element and a second coupled element engaged with the first coupled element.

8. The fastener as claimed in claim 7 wherein the first and second coupled elements engage with each other via two pivotal ears formed on sides of the first and second coupled elements and a pivotal pin; wherein the first and second coupled elements pivot with respect to each other via the pivotal pin.

9. The fastener as claimed in claim 1 further comprising a channel formed through the pivotal portion and piercing the two clamping portions; wherein a bolt and a nut couple the first and second coupled elements and the second end of the joint member to one another by inserting the bolt through the channel and engaging with the nut.

10. The fastener as claimed in claim 9 further comprising two non-circular holes respectively formed on an outer periphery of the two clamping portions and integrated to two ends of the channel; wherein the bolt is inserted through the channel from one of the non-circular holes and through the joint member to the other non-circular hole and engages with the nut.

11. . The fastener as claimed in claim 10, wherein the joint member includes a pivoting hole through the second end transversely and corresponding to the pivotal portion.

12. A fastener comprising:
a body member including a receiving portion longitudinally formed therein, wherein the receiving portion is slidably mounted to a support, with at least one clamping portion transversely extending from the receiving portion, and with a through-hole provided through each at least one clamping portion, respectively;
a joint member having a first end opposite to the body member and a second end coupled to the at least one clamping portion of the body member in a pivotal manner, with the joint member including a cam portion defined on a distal portion of the second end and a fixed hole provided through the second end transversely and corresponding to the through-hole;
wherein the joint member is moveable relative to the body member between an unfolding position and a folding position; wherein the cam portion restricts a pivot angle of the joint member relative to the body member when the joint member is in the unfolding position; and
a fixing member installed to the at least one clamping portion of the body member opposite to the joint member, with the fixing member selectively inserted into the through-hole and the fixed hole for fixing the joint member in position, with the fastener further comprising a receptacle formed on an outer periphery of the at least one clamping portion, with the though-hole formed in the receptacle; wherein the fixing member includes a fixing element fit in the receptacle, with an elastic element sandwiched between the fixing element and the receptacle, with the fixing element having an engaged portion; wherein while the fixing element is in an idle position, the engaged portion pivots for insertion into the through-hole and the fixed hole via the elastic element.

13. The fastener as claimed in claim 12 wherein the body member consists of a first coupled element and a second coupled element engaged with the first coupled element.

14. The fastener as claimed in claim 13 wherein the first and second coupled elements engage with each other via two pivotal ears formed on sides of the first and second coupled elements and a pivotal pin; wherein the first and second coupled elements pivot with respect to each other via the pivotal pin.

15. A fastener means comprising:
a body member including a receiving portion longitudinally formed therein, wherein the receiving portion is slidably mounted to a support, with at least one clamping portion transversely extending from the receiving portion, and with a through-hole provided through each at least one clamping portion, respectively;
a joint member having a first end opposite to the body member and a second end coupled to the at least one clamping portion of the body member in a pivotal manner, with the joint member including a cam portion defined on a distal portion of the second end and a fixed hole provided through the second end transversely and corresponding to the through-hole;
wherein the joint member is moveable relative to the body member between an unfolding position and a folding position; wherein the cam portion restricts a pivot angle of the joint member relative to the body member when the joint member is in the unfolding position; and
a fixing member installed to the at least one clamping portion of the body member opposite to the joint member, with the fixing member selectively inserted into the through-hole and the fixed hole for fixing the joint member in position, with the fastener further comprising a gap formed on a sidewall of the receiving portion and communicating with the second end of the joint member.

16. The fastener as claimed in claim 15, further comprising a joint sheath provided at the first end of the joint member, with a rack inserted into the joint sheath.

17. The fastener as claimed in claim 15 wherein the body member consists of a first coupled element and a second coupled element engaged with the first coupled element.

18. The fastener as claimed in claim 17 wherein the first and second coupled elements engage with each other via two pivotal ears formed on sides of the first and second coupled elements and a pivotal pin; wherein the first and second coupled elements pivot with respect to each other via the pivotal pin.

19. The fastener comprising:
a body member including a receiving portion longitudinally formed therein, wherein the receiving portion is slidably mounted to a support, with at least one clamping portion transversely extending from the receiving portion, and with a through-hole provided through each at least one clamping portion, respectively;
a joint member having a first end opposite to the body member and a second end coupled to the at least one clamping portion of the body member in a pivotal manner, with the joint member including a cam portion defined on a distal portion of the second end and the fixed hole provided through the second end transversely and corresponding to the through-hole;
wherein the joint member is moveable relative to the body member between an unfolding position and a folding position; wherein the cam portion restricts a pivot angle of the joint member relative to the body member when the joint member is in the unfolding position; and
a fixing member installed to the at least one clamping portion of the body member opposite to the joint member, with the fixing member selectively inserted into the through-hole and the fixed hole for fixing the joint member in position, with the fastener further comprising a hook portion integrally formed on a top side of the first end of the joint member for clamping a support selectively while the joint member is in the folding position.

20. The fastener as claimed in claim 19 wherein the body member consists of a first coupled element and a second coupled element engaged with the first coupled element.

* * * * *